United States Patent
Shirlen et al.

(10) Patent No.: US 8,838,861 B2
(45) Date of Patent: Sep. 16, 2014

(54) METHODS AND APPARATUSES FOR TRACE MULTICAST ACROSS A BUS STRUCTURE, AND RELATED SYSTEMS

(75) Inventors: Martyn Ryan Shirlen, Wake Forest, NC (US); Mark Michael Schaffer, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 13/531,863

(22) Filed: Jun. 25, 2012

(65) Prior Publication Data

US 2013/0304955 A1  Nov. 14, 2013

Related U.S. Application Data

(60) Provisional application No. 61/644,601, filed on May 9, 2012.

(51) Int. Cl.
*G06F 11/36* (2006.01)
(52) U.S. Cl.
CPC .......... *G06F 11/3656* (2013.01); *G06F 11/364* (2013.01)
USPC ............................. 710/110; 710/305; 714/724
(58) Field of Classification Search
CPC   G06F 11/364; G06F 11/3656; G06F 11/3664
USPC .................. 710/110, 305; 714/724
See application file for complete search history.

(56) References Cited

U.S. PATENT DOCUMENTS

| 6,751,751 | B1 | 6/2004 | Murray et al. |
| 7,769,893 | B2 | 8/2010 | Goossens |
| 2008/0098207 | A1 | 4/2008 | Reid et al. |
| 2010/0002589 | A1 | 1/2010 | Ciordas et al. |
| 2011/0041010 | A1 | 2/2011 | Mayer |
| 2011/0202801 | A1 | 8/2011 | Horley et al. |

OTHER PUBLICATIONS

Goossens K., et al., "Transaction-Based Communication-Centric Debug", Networks-On-Chip, 2007. NOCS 2007, First International Symposium on, IEEE, PI, May 1, 2007, pp. 95-106, XP031090748, ISBN: 978-0-7695-2773-4.
International Search Report and Written Opinion—PCT/US2013/040413—ISA/EPO—Jul. 26, 2013.
Texas Instruments: "KeyStone I Architecture; Debug and Trace", Sep. 2011, pp. 1-85, XP055071778.

*Primary Examiner* — Glenn A Auve
(74) *Attorney, Agent, or Firm* — Nicholas J. Pauley; Peter Michael Kamarchik; Joseph Agusta

(57) ABSTRACT

Systems and methods for trace multicast across a bus structure are provided. Preferably, the bus structure is that of a System-on-a-Chip (SoC), where the SoC includes a number of master components and a number of slave components connected via the bus structure. The bus structure supports a trace multicast feature. In one embodiment, the bus structure receives a bus transaction from a master component and, in response, outputs the bus transaction to a corresponding slave port. In addition, the bus structure determines whether a trace multicast is desired for the bus transaction. If a trace multicast is desired, the bus structure generates an additional bus transaction having one or more transaction attributes that include a translated version of the bus transaction and outputs the additional bus transaction to a trace slave port of the bus structure. The trace multicast feature provides a non-invasive mechanism for driver-level trace.

22 Claims, 3 Drawing Sheets

US 8,838,861 B2

METHODS AND APPARATUSES FOR TRACE MULTICAST ACROSS A BUS STRUCTURE, AND RELATED SYSTEMS

RELATED APPLICATIONS

The present application is related to U.S. Provisional Patent Application Ser. No. 61/644,601 filed on May 9, 2012 and entitled "METHODS AND APPARATUSES FOR TRACE MULTICAST ACROSS SYSTEM-ON-CHIPS (SOC) SYSTEM BUS, AND RELATED SYSTEMS," which is incorporated herein by reference in its entirety.

BACKGROUND

I. Field of the Disclosure

The technology of the disclosure relates generally to a bus structure for a System-on-a-Chip (SoC) for processor-based systems that provides a trace multicast feature.

II. Background

Modern System-on-Chips (SoCs) have a variety of non-invasive trace mechanisms provided to trace program flow, or execution, of Central Processing Units (CPUs) or Digital Signal Processors (DSPs), bus and specialized hardware activity, system performance metrics, and the like. These are generally low-level trace mechanisms. In addition to these traditional low-level trace mechanisms, "driver" level trace, such as Advanced Reduced instruction Set Computer (RISC) Machine (ARM) System Trace Macrocell (STM), is becoming an increasingly important SoC trace mechanism. In general, driver-level trace allows for driver-level instrumented trace by, for example, adding appropriate trace instructions at the driver level. For example, store instructions may be added to a video driver at relevant areas of the driver code in order to cause trace to be generated and optionally time-stamped.

Driver-level trace allows software developers to analyze the performance of code (e.g., speed, power, etc.). The intent of the driver-level trace is to be as non-intrusive as possible to the code to which instrumentation is added. In other words, once driver-level trace instrumentation is added to a piece of code, the resultant code should be as close to its original state as possible so that performance analysis results have the least amount of "driver" instrumentation error. However, in some situations, adding driver-level trace instrumentation to code can add an unacceptable amount of driver instrumentation error, perhaps completely obscuring a bug in the code. For example, in order to benchmark sections of code where every write or read to a system configuration register in a certain address range is traced in order to debug configuration/boot code bugs, blindly adding instrumentation to every store and load instruction would add an unacceptable amount of driver instrumentation error, perhaps completely obscuring the bug.

Thus, there is a need for systems and methods that enable a minimally invasive driver-level trace that overcomes the limitations discussed above.

SUMMARY OF THE DISCLOSURE

Systems and methods for trace multicast across a bus structure are provided. Preferably, the bus structure is that of a System-on-a-Chip (SoC), where the SoC includes a number of master components (e.g., Central Processing Units (CPUs), Direct Memory Access (DMA) controllers, or the like) and a number of slave components (e.g., memory, a modem, or the like) connected via the bus structure. The bus structure supports a trace multicast feature. In one embodiment, the bus structure receives a bus transaction from one of the master components and, in response, outputs the bus transaction to a corresponding slave port of the bus structure. In addition, the bus structure determines whether a trace multicast is desired for the bus transaction. If the bus structure determines that a trace multicast is desired for the bus transaction, the bus structure generates an additional bus transaction having one or more transaction attributes that include a translated version of the bus transaction and outputs the additional bus transaction to a trace slave port of the bus structure. In one embodiment, the additional bus transaction is an additional write bus transaction to a desired address in a memory-mapped trace generator of a debug system connected to the trace slave port of the bus structure. The trace multicast feature provides a non-invasive mechanism for driver-level trace.

DETAILED DESCRIPTION

Figure 1:
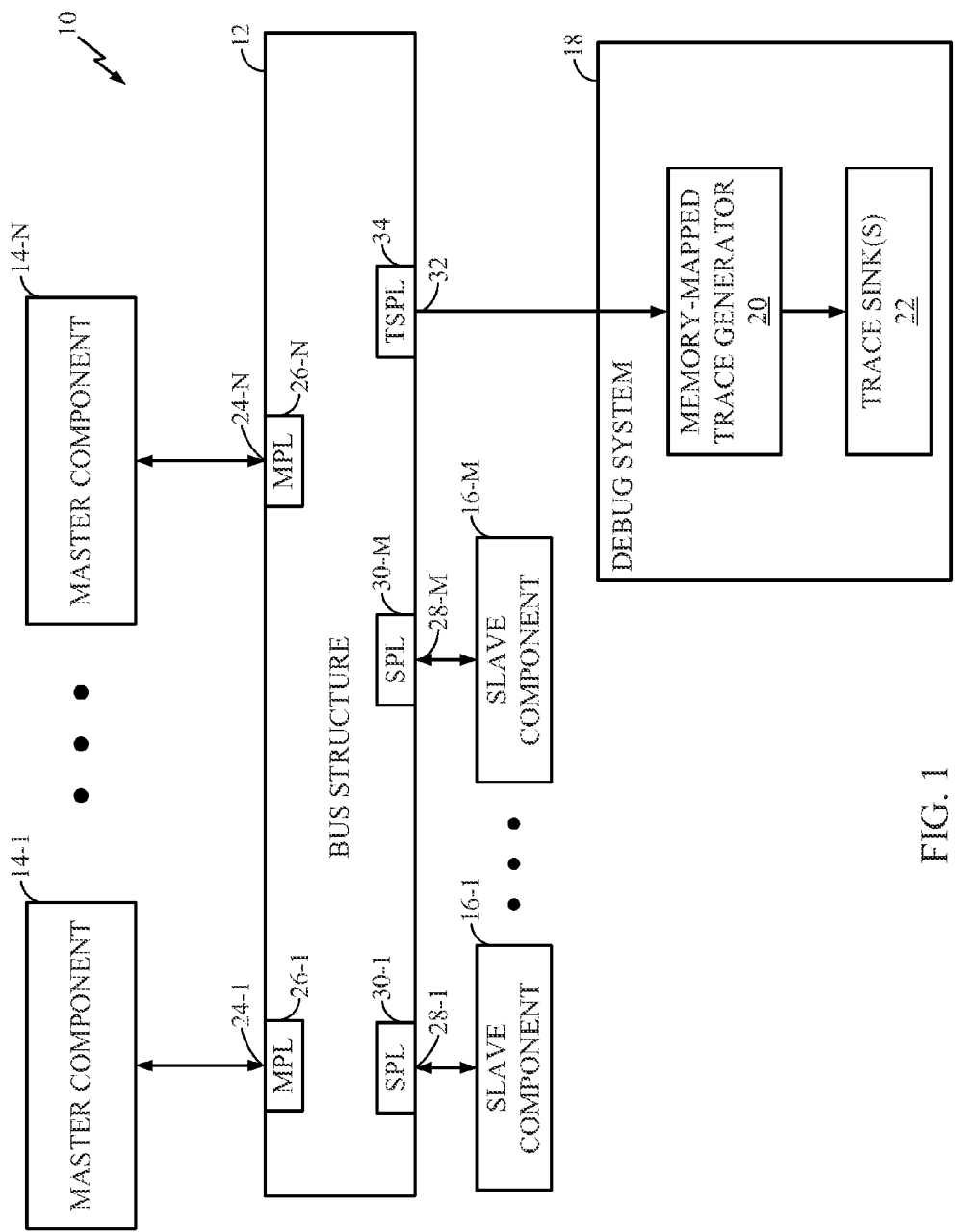
FIG. 1 is a block diagram of an exemplary System-on-a-Chip (SoC) including a bus structure that provides a trace multicast feature according to one embodiment of the present disclosure.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Systems and methods for trace multicast across a bus structure are provided. Preferably, the bus structure is that of a System-on-a-Chip (SoC), where the SoC includes a number of master components (e.g., Central Processing Units (CPUs), Direct Memory Access (DMA) controllers, or the like) and a number of slave components (e.g., memory, a modem, or the like) connected via the bus structure. The bus structure supports a trace multicast feature. In one embodiment, the bus structure receives a bus transaction from one of the master components and, in response, outputs the bus transaction to a corresponding slave port of the bus structure. In addition, the bus structure determines whether a trace multicast is desired for the bus transaction. If the bus structure determines that a trace multicast is desired for the bus transaction, the bus structure generates an additional bus transaction having one or more transaction attributes that include a translated version of the bus transaction and outputs the additional bus transaction to a trace slave port of the bus structure. In one embodiment, the additional bus transaction is an additional write bus transaction to a desired address in a memory-mapped trace generator of a debug system connected to the trace slave port of the bus structure. The trace multicast feature provides a non-invasive mechanism for driver-level trace.

In this regard, FIG. 1 illustrates a SoC 10 that includes a bus structure 12 that provides a trace multicast feature according to one embodiment of the present disclosure. The SoC 10 is a system implemented on a single semiconductor die. However, the bus structure 12 having the trace multicast feature is not limited to use in a SoC. The bus structure 12 may be used in any system that desires a non-invasive trace feature. The bus structure 12 is any type of bus resource such as, for example, a bus fabric, a Network-on-a-Chip (NoC), a crossbar bus structure, or the like. As illustrated, the bus structure 12 interconnects a number of system components, which include a number of master components 14-1 through 14-N (generally referred to herein collectively as the master components 14 and individually as the master component 14), a number of slave components 16-1 through 16-M (generally referred to herein collectively as the slave components 16 and individually as the slave component 16), and a debug system 18. The master components 14 are any type of master components in the SoC 10 and may include, for example, one or more CPUs, one or more DMA controllers, or the like. The slave components 16 are any type of slave components in the SoC 10 and may include, for example, memory, a modem, or the like.

In this embodiment, the debug system 18 includes a memory-mapped trace generator 20 and one or more trace sinks 22. In general, the memory-mapped trace generator 20 is a driver-level trace mechanism such as, for example, the Advanced Reduced Instruction Set Computer (RISC) Machine (ARM) System Trace Macrocell (STM). Note, however, that any suitable driver-level trace mechanism may be used and, as such, the present disclosure is not limited to the ARM STM. The one or more trace sinks 22 are generally any type of sinks for a system trace output by the memory-mapped trace generator 20. For example, the one or more trace sinks 22 may include one or more pins of the SoC 10, a Universal Serial Bus (USB) connector, main memory that is external to the SoC 10, or the like. In the ARM architecture, the one or more trace sinks 22 may include a Trace Port Interface Unit (TPIU).

In this embodiment, the bus structure 12 includes master ports 24-1 through 24-N (generally referred to herein collectively as the master ports 24 or individually as the master port 24) associated with corresponding master port logic 26-1 through 26-N (generally referred to herein collectively and individually as the master port logic 26). Notably, in this embodiment, each of the master components 14 is connected to the bus structure 12 via one of the master ports 24. However, some or potentially all of the master components 14 may alternatively be connected to the bus structure 12 via multiple master ports 24. As used herein, each of the master ports 24 is a physical interface, or interconnect, to the bus structure 12, and the corresponding master port logic 26 is logic associated with the master port 24. As discussed below, the master port logic 26 operates to process bus transactions received by the bus structure 12 via the corresponding master port 24.

In a similar manner, the bus structure 12 includes slave ports 28-1 through 28-M (generally referred to herein collectively as the slave ports 28 or individually as the slave port 28) associated with corresponding slave port logic 30-1 through 30-M (generally referred to herein collectively and individually as the slave port logic 30). Notably, in this embodiment, each of the slave components 16 is connected to the bus structure 12 via one of the slave ports 28. However, some or potentially all of the slave components 16 may alternatively be connected to the bus structure 12 via multiple slave ports 28. As used herein, each of the slave ports 28 is a physical interface, or interconnect, to the bus structure 12, and the corresponding slave port logic 30 is logic associated with the slave port 28. The bus structure 12 also includes a trace slave port 32 and corresponding trace slave port logic 34. As discussed below, upon receiving a bus transaction for which a trace multicast is desired, the bus structure 12 operates to output the bus transaction to an appropriate slave port 28 based on an address of the bus transaction and, in addition, outputs one or more additional bus transactions to the debug system 18 via the trace slave port logic 34 and the trace slave port 32.

Figure 2:
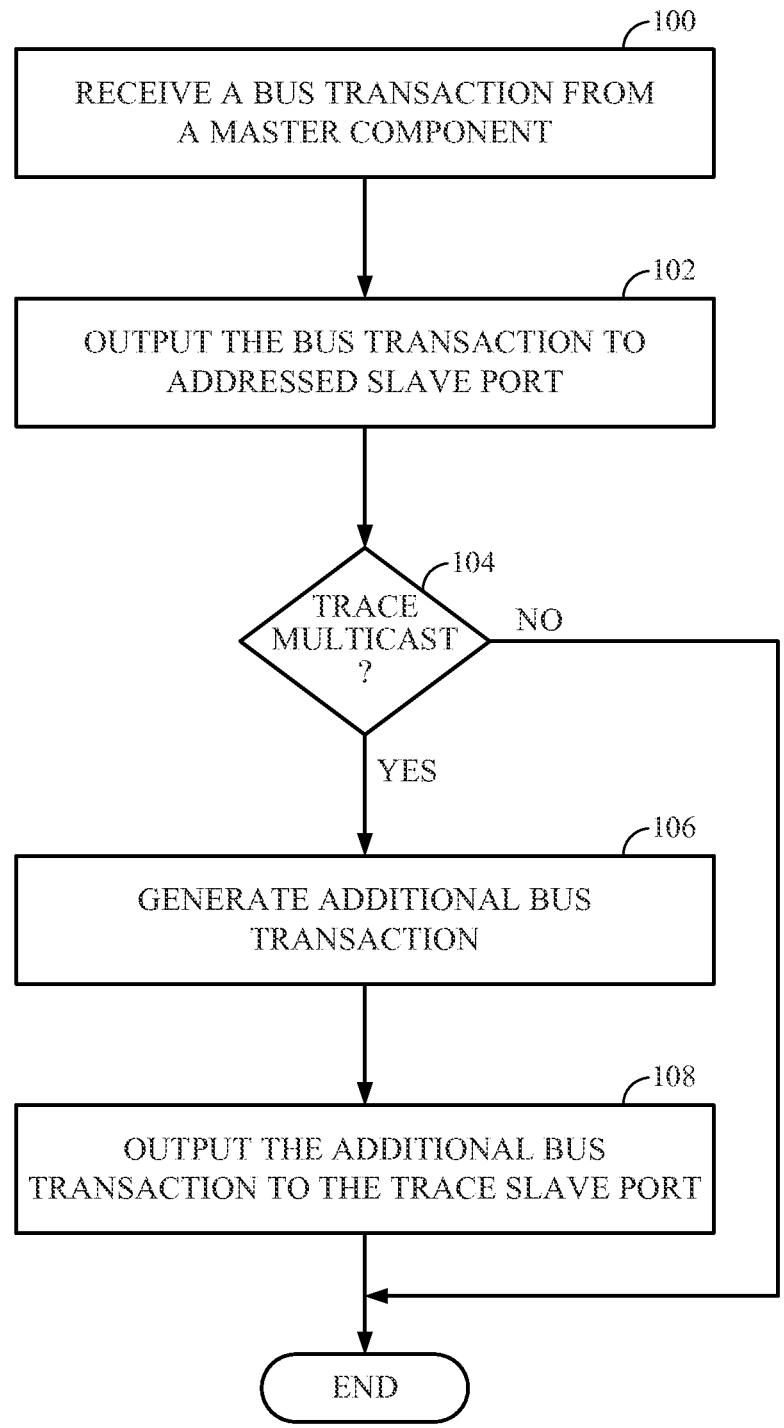
FIG. 2 is a flow chart that illustrates the operation of the bus structure of FIG. 1 to provide trace multicast according to one embodiment of the present disclosure.

FIG. 2 is a flow chart that illustrates the operation of the bus structure 12 of FIG. 1 according to one embodiment of the present disclosure. First, the bus structure 12 receives a bus transaction from one of the master components 14 via the corresponding master port 24 (block 100). The master port logic 26 for the master port 24 at which the bus transaction is received outputs the bus transaction to the appropriate slave port 28 in the conventional manner (block 102). More specifically, the bus transaction is addressed and, based on the address of the bus transaction, the master port logic 26 outputs the bus transaction to the appropriate slave port 28. In addition, the master port logic 26 determines whether a trace multicast is desired for the bus transaction (block 104). As used herein, a "trace multicast" is the concurrent output of: (1) the bus transaction to the appropriate slave port 28 of the bus structure 12 as described with respect to block 102 and (2) an additional bus transaction to the trace slave port 32 where the additional bus transaction has one or more attributes that include a translated version of the bus transaction.

In one embodiment, the bus transaction includes an indicator that a trace multicast is desired for the bus transaction, and the master port logic 26 determines whether a trace multicast is desired for the bus transaction based on the indicator. The indicator may be, for example, an attribute of a page of memory associated with the bus transaction (e.g., a CPU/Digital Signal Processor (DSP) Memory Management Unit (MMU) or a system MMU page table attribute), a DMA descriptor attribute associated with the bus transaction, or the like. The indicator may be provided by one or more bits included in control information of the bus transaction (e.g., a trace multicast bit that is set to 0 if a trace multicast is not desired and set to 1 if a trace multicast is desired). The one or more bits may be one or more bits provided on one or more additional wires added to an existing bus. Alternatively, the indicator may be encoded into one or more bits of the control information for the bus transaction (e.g., if there is a 4-bit control bus where only 8 of the 16 possible encodings are used and the other 8 possible encodings are RESERVED, one or more of the RESERVED encodings may be used for the indicator).

In another embodiment, an indicator that a trace multicast is desired for the bus transaction is stored in one or more configurable register bits associated with the bus transaction. More specifically, in one embodiment, the one or more configurable register bits may be associated with the master port 24 and included in one or more registers in the master port logic 26. The master port logic 26 determines that a trace multicast is desired for the bus transaction based on the one or more configurable register bits associated with the bus transaction.

In yet another embodiment, whether included in the bus transaction or stored in one or more register bits associated with the bus transaction, the indicator that the bus transaction is associated with a trace multicast request may enable filtering. More specifically, the indicator may include or otherwise represent one or more filtering criteria. The one or more filtering criteria may represent one or more bus transaction types for which trace multicast is desired, one or more addresses or ranges of addresses for which trace multicast for bus transactions for those address(es) is desired, or the like, or any combination thereof. The master port logic 26 then determines that a trace multicast for the bus transaction is desired if the bus transaction satisfies the one or more filtering criteria. For example, the indicator may include multiple bits that map to special control signal encodings such as, for example, an encoding that indicates that a trace multicast is desired only for write bus transactions, an encoding that indicates that a trace multicast is desired only for read bus transactions, an encoding that indicates that a trace multicast is desired only for write and read bus transactions, an encoding that indicates that a trace multicast is desired only for exclusive bus transactions, or an encoding that indicates that a trace multicast is desired only for bus transactions that timeout/hang or return error responses. It should be noted that the indicator may additionally represent whether the trace multicast must be guaranteed or timing invariant. For instance, the indicator may include multiple bits that map to special control signal encodings such as, for example, an encoding that indicates that the trace multicast must be guaranteed or timing invariant. Notably, a trace multicast selected or otherwise configured to have guaranteed trace delivery is referred to as "guaranteed." In this case, the trace multicast may become invasive due to rippling backpressure on the trace pipe. Conversely, a trace multicast may be selected or otherwise configured to have non-guaranteed delivery (i.e., timing invariant). In this case, if the trace pipe cannot accommodate the trace multicast, then that trace multicast may be dropped, perhaps with an error condition at some later point in time.

If the master port logic 26 determines that a trace multicast is not desired, the process ends. However, if the master port logic 26 determines that a trace multicast is desired, the master port logic 26 generates an additional bus transaction having one or more attributes that include a translated version of the bus transaction (block 106). More specifically, in the preferred embodiment discussed below, the additional bus transaction is an additional write bus transaction to an appropriate address in a memory space of the memory-mapped trace generator 20. However, the additional bus transaction is not limited thereto. For example, the additional bus transaction may alternatively be a specialized trace bus transaction that simply instructs the debug system 18 to make a trace packet with a given set of attributes.

In one embodiment, the memory space of the memory-mapped trace generator 20 includes different addresses allocated for each of the master components 14 (i.e., the master components 14 are mapped to addresses in the memory space of the memory-mapped trace generator 20). Additionally, for each of the master components 14, the addresses in the memory space of the memory-mapped trace generator 20 allocated to the master component 14 may include addresses allocated for each of a number of packet types (e.g., data). As such, the master port logic 26 generates the additional write bus transaction such that the additional write bus transaction is addressed to an address in the memory space of the memory-mapped trace generator 20 that is allocated for the master component 14 and, in some embodiments, allocated for the appropriate packet type. In this manner, the master component 14 is identified as a source of the resulting trace packet.

The additional write bus transaction includes one or more attributes that include a translated version of the bus transaction. The one or more attributes of the additional write bus transaction include an address for the additional write bus transaction and/or a payload of the additional write bus transaction. In one embodiment, both the address of the additional write bus transaction and the payload of the additional write bus transaction are translated versions of the bus transaction. More specifically, as discussed above, each of the master components 14 is mapped to a group of addresses in the memory space of the memory-mapped trace generator 20. In other words, a different group of addresses in the memory space of the memory-mapped trace generator 20 is allocated to each of the master components 14. Based on this mapping, the master port logic 26 may translate the bus transaction to provide the address for the additional write bus transaction by translating the source of the bus transaction (i.e., the master component 14) into an address in the memory space of the memory-mapped trace generator 20 allocated for the source of the bus transaction and, in some embodiments, the desired packet type. Further, if using MIPI STPv2, different bus transaction types (e.g., read, write, exclusive, or the like) may be mapped to different channels for the corresponding master component 14. So, in another embodiment, the master port logic 26 addresses the additional write bus transaction to an address in the memory-space of the memory-mapped trace generator 20 allocated for the master component 14 and the channel allocated for the corresponding bus transaction type. Alternatively, the bus transaction type may be included in the payload of the additional write bus transaction. Further, for MIPI STPv2, a trace multicast (i.e., an additional write bus operation) could map {master port, MID} to a given MIPI STPv2 master Identification (ID) (configurable in multicast hardware) or embed this information in the payload of the additional write bus operation.

In addition, the master port logic 26 translates the bus transaction to provide the payload of the additional write bus transaction. More specifically, the master port logic 26 may translate the bus transaction such that the address of the bus transaction, a portion of the address of the bus transaction, the payload of the bus transaction, a portion of the payload of the bus transaction, the control information of the bus transaction, a portion of the control information of the bus transaction, a compressed version of the address of the bus transaction, a compressed version of the payload of the bus transaction, a compressed version of the control information of the bus transaction, or any combination thereof is included in the payload of the additional write bus transaction. Notably, the compression may be based on an address/data/control filter, e.g., output a special compressed marker packet in response to a filtering match. In some implementations, multiple additional write bus transactions may be needed. For example, one additional write bus transaction may be created to carry the address of the bus transaction or a portion thereof, another additional write bus transaction may be created to carry the payload of the bus transaction or a portion thereof, and yet another additional write bus transaction may be created to carry the control information of the bus transaction or a portion thereof. Each of these additional write bus transactions may be addressed to different addresses in the memory space of the memory-mapped trace generator 20 that are allocated to the master component 14. For example, using MIPI STPv2, the additional write bus transactions may be written to different channels allocated for the master component 14, where each channel is allocated for a different type of payload (e.g., address of the corresponding bus transactions, payload of the corresponding bus transactions, or control information of the corresponding bus transactions).

In another embodiment, the additional bus transaction is a flag (i.e., includes no payload), where the address of the additional bus transaction is a translated version of the bus transaction. More specifically, as discussed above, a different group of addresses in the memory space of the memory-mapped trace generator 20 are allocated to each of the master components 14. The master port logic 26 may then translate the bus transaction to provide the address for the additional bus transaction by translating the source of the bus transaction (i.e., the master component 14) into an address in the memory space of the memory-mapped trace generator 20 that is allocated for the source of the bus transaction and, in some embodiments, the desired type. Still further, the addresses in the memory space of the memory-mapped trace generator 20 may be further allocated for bus transactions that satisfy different criteria such as, for example, bus transaction types, addresses, address ranges, or the like. For example, a group of addresses in the memory space of the memory-mapped trace generator 20 may be allocated to the master component 14 and, within that group, different addresses may be allocated for different bus transaction types, different addresses, or different address ranges. So, if different addresses in the memory space of the memory-mapped trace generator 20 are allocated for write bus transactions to different pages of memory and the bus transaction is a write bus transaction to a specific page of memory, the master port logic 26 may address the additional bus transaction to an address in the memory space of the memory-mapped trace generator 20 that is allocated to write bus transactions from the master component 14 to that page of memory. In this manner, flags are generated for writes to particular pages of memory.

It should be noted that the manner in which the master port logic 26 translates the bus transaction to generate the additional bus transaction may be configurable. In this regard, in one embodiment, the indicator that that a trace multicast is desired, whether included in the bus transaction or stored in or in association with the master port logic 26, may include one or more bits that represent the manner in which the bus transaction is to be translated to generate the additional bus transaction. For example, the indicator may include one or more bits that map to special control signal encodings that define the manner in which the bus transaction is to be translated when generating the corresponding additional bus transaction (e.g., include only address, include only data, include both address and data, include a compressed version of the address, include a compressed version of the data, or include a compressed version of both the address and data).

Once the master port logic 26 generates the additional bus transaction, the master port logic 26 outputs the additional bus transaction to the trace slave port 32 via the trace slave port logic 34 (block 108). In some embodiments, buffering of additional bus transactions, such as the additional bus transaction, may be performed in the trace slave port logic 34, in the debug system 18, or between the trace slave port 32 and the debug system 18. Notably, while FIG. 2 illustrates the operation of the bus structure 12 as a sequential process, the illustrated blocks may be performed in a different order and some of the blocks may be performed in parallel. For example, block 102 may be performed in parallel with blocks 104 through 108 such that the master port logic 26 generates and outputs the additional bus transaction at the same time as, or concurrently with, outputting the bus transaction to the appropriate slave port 28.

Returning briefly to FIG. 1, in response to receiving the additional bus transaction from the bus structure 12 via the trace slave port 32, the memory-mapped trace generator 20 converts the additional bus transaction, which is preferably an additional write bus transaction, into one or more trace packets. The memory-mapped trace generator 20 then provides the one or more trace packets to the desired trace sink 22 as part of a trace stream. The trace packet(s) may optionally be time-stamped for temporal correlation of the resulting trace stream within the trace stream or temporal correlation to another time-stamped trace stream not related to the trace stream (e.g., a CPU trace stream).

The method and apparatus for trace multicast across a bus structure of a SoC according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 3:
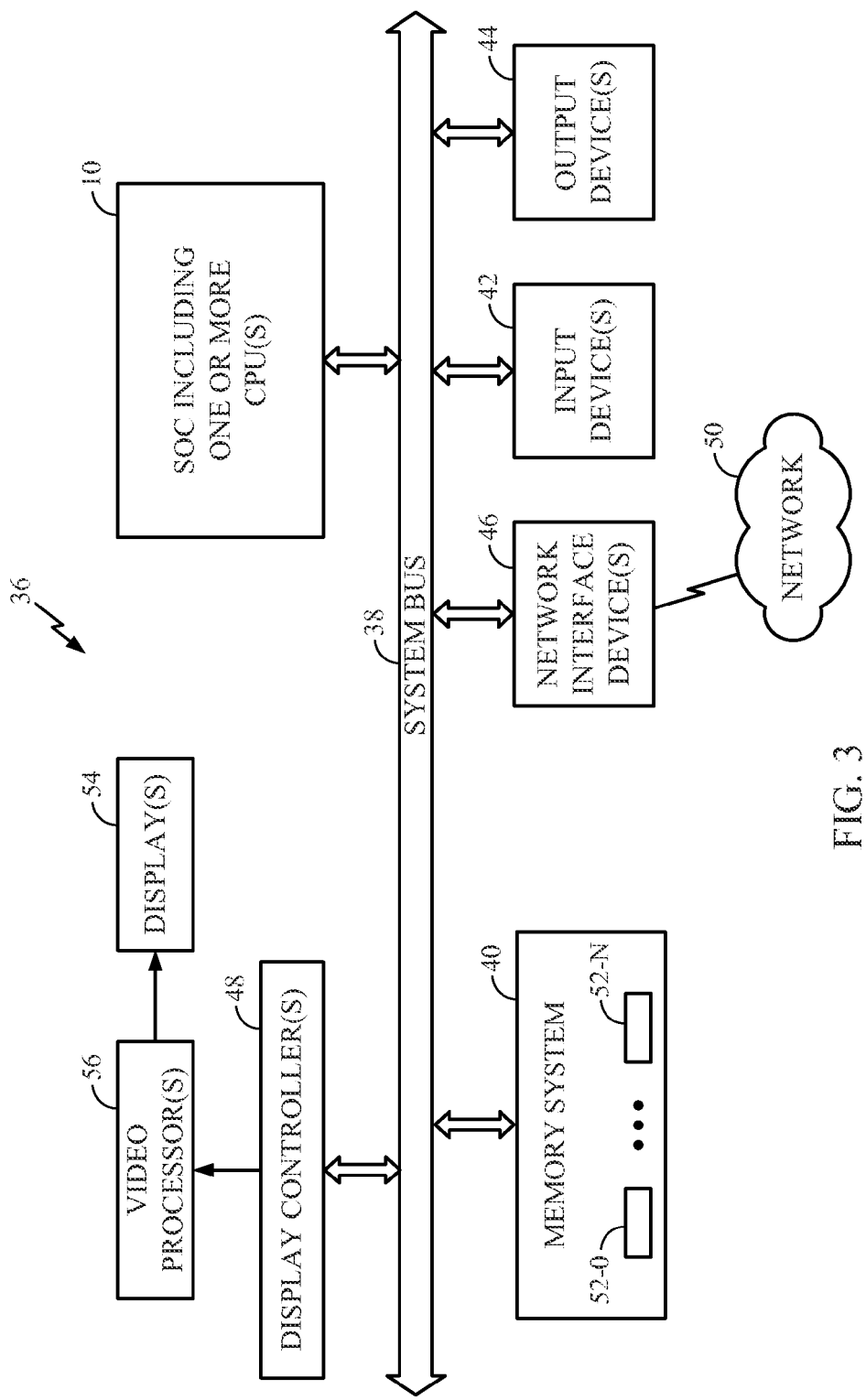
FIG. 3 is a block diagram of an exemplary processor-based system that can include the SoC of FIG. 1.

In this regard, FIG. 3 illustrates an example of a processor-based system 36 that can employ the SoC 10 illustrated in FIG. 1. In this example, the processor-based system 36 includes the SoC 10, which in this embodiment includes one or more CPUs. As discussed above, the SoC 10 includes the bus structure 12 that interconnects the master components 14, the slave components 16, and the debug system 18 (FIG. 1) and provides a trace multicast feature. Each of the CPU(s) is one of the master components 14 of the SoC 10. The CPU(s) may have cache memory for rapid access to temporarily stored data. While not illustrated, the SoC 10 may also include components such as, for example, one or more DMA controllers. The SoC 10 is coupled to a system bus 38. As is well known, the SoC 10 communicates with other devices via the system bus 38 by exchanging address, control, and data information over the system bus 38. Although not illustrated in FIG. 3, multiple system buses 38 could be provided, wherein each system bus 38 constitutes a different fabric.

Other devices can be connected to the system bus 38. As illustrated in FIG. 3, these devices can include a memory system 40, one or more input devices 42, one or more output devices 44, one or more network interface devices 46, and one or more display controllers 48, as examples. The input device(s) 42 can include any type of input device, including but not limited to input keys, switches, voice processors, etc. The output device(s) 44 can include any type of output device, including but not limited to audio, video, other visual indicators, etc. The network interface device(s) 46 can be any devices configured to allow exchange of data to and from a network 50. The network 50 can be any type of network, including but not limited to a wired or wireless network, a private or public network, a local area network (LAN), a wide local area network (WLAN), and the Internet. The network interface device(s) 46 can be configured to support any type of communication protocol desired. The memory system 40 can include one or more memory units 52-0 through 52-N.

The CPU(s) implemented in the SoC 10 may also be configured to access the display controller(s) 48 over the system bus 38 to control information sent to one or more displays 54. The display controller(s) 48 sends information to the display(s) 54 to be displayed via one or more video processors 56, which process the information to be displayed into a format suitable for the display(s) 54. The display(s) 54 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a DSP, an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A system, comprising:
   a plurality of system components comprising one or more master components and one or more slave components; and
   a bus structure that interconnects the plurality of system components, the bus structure configured to:
      receive a bus transaction from a master component of the one or more master components via a master port of the bus structure;
      output the bus transaction to a slave component of the one or more slave components via a corresponding slave port of the bus structure;
      determine that a trace multicast is desired for the bus transaction; and
      in response to determining that a trace multicast is desired for the bus transaction:
         generate an additional bus transaction having one or more transaction attributes that comprise a translated version of the bus transaction; and
         output the additional bus transaction to a trace slave port of the bus structure.

2. The system of claim 1 wherein the bus structure is further configured to concurrently:
   output the bus transaction to the slave component of the one or more slave components via the corresponding slave port of the bus structure;
   determine that a trace multicast is desired for the bus transaction; and
   in response to determining that a trace multicast is desired for the bus transaction:
      generate the additional bus transaction having the one or more transaction attributes that comprise the translated version of the bus transaction; and
      output the additional bus transaction to the trace slave port of the bus structure.

3. The system of claim 1 wherein the plurality of system components further comprises a debug system configured to:
   receive the additional bus transaction from the trace slave port of the bus structure; and
   convert the additional bus transaction into one or more trace packets.

4. The system of claim 3 wherein the debug system comprises a memory-mapped trace generator, and the additional bus transaction is an additional write bus transaction to an address in a memory space of the memory-mapped trace generator that is allocated to the master component.

5. The system of claim 1 wherein the bus structure is configured to determine that a trace multicast is desired for the bus transaction based on an indicator associated with the bus transaction that indicates that a trace multicast is desired for the bus transaction.

6. The system of claim 5 wherein the bus transaction comprises the indicator that a trace multicast is desired for the bus transaction.

7. The system of claim 5 wherein the indicator that a trace multicast is desired for the bus transaction is a memory management unit page table attribute associated with the bus transaction.

8. The system of claim 5 wherein the indicator that a trace multicast is desired for the bus transaction is a Direct Memory Access descriptor attribute associated with the bus transaction.

9. The system of claim 5 wherein the indicator is stored in association with the bus transaction that indicates that a trace multicast is desired for the bus transaction.

10. The system of claim 9 wherein the indicator stored in association with the bus transaction is stored in one or more configurable register bits associated with the bus transaction.

11. The system of claim 10 wherein the one or more configurable register bits are included in master port logic associated with the master port at which the bus transaction is received.

12. The system of claim 5 wherein the indicator is also indicative of one or more filtering criteria such that the bus structure determines that a trace multicast is desired for the bus transaction if the bus transaction satisfies the one or more filtering criteria.

13. The system of claim 12 wherein the one or more filtering criteria comprises at least one of a group consisting of a bus transaction type for which trace multicast is desired, an address for which trace multicast is desired, and a range of addresses for which trace multicast is desired.

14. The system of claim 5 wherein the indicator is also indicative of a manner in which the bus transaction is to be translated in order to generate the additional bus transaction.

15. The system of claim 1 further comprising:
a debug system that comprises a memory-mapped trace generator configured to receive the additional bus transaction via the trace slave port;
wherein the one or more transaction attributes of the additional bus transaction comprise an address of the additional bus transaction, and the bus structure is configured to generate the additional bus transaction such that the address of the additional bus transaction is an address in a memory space of the memory-mapped trace generator that is allocated to the master component.

16. The system of claim 1 wherein the one or more transaction attributes of the additional bus transaction comprise a payload of the additional bus transaction, and the translated version of the bus transaction is included in the payload of the additional bus transaction and comprises at least one of a group consisting of: an address of the bus transaction, a portion of the address of the bus transaction, data from a payload of the bus transaction, a portion of the data from the payload of the bus transaction, control information from the bus transaction, and a portion of the control information from the bus transaction.

17. The system of claim 1 wherein the one or more transaction attributes of the additional bus transaction comprise a payload of the additional bus transaction, and the translated version of the bus transaction is included in the payload of the additional bus transaction and comprises at least one of a group consisting of: a compressed version of an address of the bus transaction, a compressed version of data from the bus transaction, and a compressed version of control information from the bus transaction.

18. The system of claim 1 integrated into a semiconductor die.

19. The system of claim 1, further comprising a device selected from a group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player, into which the system is integrated.

20. A system, comprising:
a plurality of system components comprising one or more master components and one or more slave components; and
a means for interconnecting the plurality of system components, the means for interconnecting the plurality of system components configured to:
receive a bus transaction from a master component of the one or more master components;
output the bus transaction to a slave component of the one or more slave components;
determine that a trace multicast is desired for the bus transaction; and
in response to determining that a trace multicast is desired for the bus transaction:
generate an additional bus transaction having one or more transaction attributes that comprise a translated version of the bus transaction; and
output the additional bus transaction to a trace slave port of the means for interconnecting the plurality of system components.

21. A method of operation of a bus structure that interconnects a plurality of system components of a system, comprising:
receiving a bus transaction from one of the plurality of system components via a master port of the bus structure;
outputting the bus transaction to a corresponding slave port of the bus structure;
determining that a trace multicast is desired for the bus transaction; and
in response to determining that a trace multicast is desired for the bus transaction:
generating an additional bus transaction having one or more transaction attributes that comprise a translated version of the bus transaction; and
outputting the additional bus transaction to a trace slave port of the bus structure.

22. A non-transitory computer-readable medium storing software for instructing a bus structure that interconnects a plurality of system components of a system to:
receive a bus transaction from one of the plurality of system components via a master port of the bus structure;
output the bus transaction to a corresponding slave port of the bus structure;
determine that a trace multicast is desired for the bus transaction; and
in response to determining that a trace multicast is desired for the bus transaction:
generate an additional bus transaction having one or more transaction attributes that comprise a translated version of the bus transaction; and
output the additional bus transaction to a trace slave port of the bus structure.

* * * * *